(12) United States Patent
Mills et al.

(10) Patent No.: US 7,617,443 B2
(45) Date of Patent: Nov. 10, 2009

(54) FLEXIBLE MULTIPLE SPREADSHEET DATA CONSOLIDATION SYSTEM

(75) Inventors: Scott H. Mills, Austin, TX (US); Kurt M. Joseph, Austin, TX (US); Melissa L. Oldenburg, Edwardsville, IL (US); Mark A. Nixon, Oklahoma City, OK (US)

(73) Assignee: AT&T Intellectual Property I, L.P., Reno, NV (US)

( * ) Notice: Subject to any disclaimer, the term of this patent is extended or adjusted under 35 U.S.C. 154(b) by 350 days.

(21) Appl. No.: 10/604,608

(22) Filed: Aug. 4, 2003

(65) Prior Publication Data

US 2005/0034058 A1 Feb. 10, 2005

(51) Int. Cl.
*G06F 17/21* (2006.01)
*G06F 17/24* (2006.01)

(52) U.S. Cl. .............. 715/212; 715/217; 715/219; 715/220; 715/227; 715/255; 715/762; 715/772

(58) Field of Classification Search .............. 715/503, 715/762, 509, 530, 212, 217, 219, 220, 227, 715/255, 772
See application file for complete search history.

(56) References Cited

U.S. PATENT DOCUMENTS

| | | | |
|---|---|---|---|
| 5,272,628 A | 12/1993 | Koss | 715/503 |
| 5,396,587 A * | 3/1995 | Reed et al. | 715/503 |
| 5,781,896 A | 7/1998 | Dalal | 707/2 |
| 5,987,481 A * | 11/1999 | Michelman et al. | 715/503 |
| 6,138,130 A * | 10/2000 | Adler et al. | 715/503 |
| 6,282,551 B1 * | 8/2001 | Anderson et al. | 715/503 |
| 6,362,838 B1 | 3/2002 | Szlam et al. | 715/762 |
| 6,430,584 B1 | 8/2002 | Comer et al. | 715/503 |
| 6,442,575 B2 | 8/2002 | Pratley et al. | 715/503 |
| 6,639,687 B1 * | 10/2003 | Neilsen | 358/1.14 |
| 2002/0042859 A1 * | 4/2002 | Lowry | 711/100 |
| 2002/0083016 A1 * | 6/2002 | Dittrich et al. | 705/80 |
| 2002/0129053 A1 * | 9/2002 | Chan et al. | 707/503 |
| 2003/0061193 A1 * | 3/2003 | Anson | 707/1 |
| 2003/0149934 A1 * | 8/2003 | Worden | 715/513 |
| 2003/0226105 A1 * | 12/2003 | Waldau | 715/503 |
| 2004/0054879 A1 * | 3/2004 | Macy et al. | 712/221 |
| 2004/0194112 A1 * | 9/2004 | Whittenberger et al. | 719/310 |

OTHER PUBLICATIONS

Halvorson et al., Microsoft Office XP Inside Out, 2001, Microsoft Press, pp. 605 and 689-697.*
"Excel add-ins. Advanced Excel Find," Jun. 2, 2003, Office-addins. com, <http://web.archive.org/web/20030602095112/office-addins.com/microsoft-excel-add-ins/Advanced-Excel-Find.html>.*
"Excel add-ins. Advanced Excel Find," Oct. 18, 2002, Office-addins. com, <http://web.archive.org/web/20021018194348/www.office-addins.com/excel-add-ins/Advanced-Excel-Find.html>.*
Howsmon, Gregg, "Lotus 1-2-3 For Sun", ECN No Name Newsletter, www.ecn.purdue.edu, Dec. 1990, (7 pgs).

* cited by examiner

*Primary Examiner*—Joshua D Campbell
(74) *Attorney, Agent, or Firm*—Toler Law Group

(57) ABSTRACT

A method of consolidating data from multiple spreadsheets includes selecting multiple spreadsheets (52). Portions of data from files corresponding to each of the spreadsheets (52) are also selected. Automated consolidation of said portions of data is executed. The consolidation includes retrieval of the portions of data, generation of a final report spreadsheet (124), and appendage of the portions of data to the final report spreadsheet (124).

16 Claims, 5 Drawing Sheets

| | A | B | C | D | E | F | G | H | I |
|---|---|---|---|---|---|---|---|---|---|
| 7 | | | | | | | | | |
| 8 | | | | | | | | | |
| 9 | | | | | TSR | % | SAVED | % Rev | CPE |
| 10 | PIN# | NAME | SALES CODE | TSR REV | % TSR | SAVED REV | % Rev At Risk | REV | % OBJ |
| 11 | 156270 | Employee A | CLSG39N | $2,661 | 101.35% | $2,145 | 47.00% | $2,479 | 103.28% |
| 12 | 156285 | Employee B | CLSG33E | $3,048 | 116.11% | $4,782 | 52.61% | $2,434 | 101.41% |
| 19 | 156201 | Employee I | CLSG32B | $2,733 | 104.11% | $3,804 | 63.99% | $5,402 | 225.07% |
| 20 | | | | | | | | | |
| 21 | | | | | | | | | |
| 22 | 9 | Manager A | TUL ABNEY | $20,955 | 88.70% | $32,573 | 52.93% | $22,388 | 103.65% |
| 23 | | | | | | | | | |
| 24 | | | | | | | | | |

Man. A / Man. B / Man. C / Man. D / Man. E / Man. F / Man. G / Man. H / Man. I / Man.

FIG.2

| | A | B | C | D | E | F | G | H | I | J | K |
|---|---|---|---|---|---|---|---|---|---|---|---|
| 1 | Workbook A | Center | Supervisor | Manager A | 156270 | Employee A | CLSG39N | $2,661 | 101.35% | $2,145 | 47 |
| 2 | Workbook A | Center | Supervisor | Manager A | 156285 | Employee B | CLSG33E | $3,048 | 116.11% | $4,782 | 47 |
| 3 | Workbook A | Center | Supervisor | Manager A | 156288 | Employee C | CLSG33H | $1,157 | 44.08% | $2,069 | 57 |
| 4 | Workbook A | Center | Supervisor | Manager A | 156225 | Employee D | CLSG33D | $1,744 | 66.43% | $3,197 | 45 |
| 5 | Workbook B | Center | Supervisor | Manager B | 156273 | Employee E | CLSG39P | $1,350 | 51.43% | $3,921 | 60 |
| 6 | Workbook B | Center | Supervisor | Manager B | 156268 | Employee F | CLSG33C | $2,815 | 107.22% | $4,297 | 47 |

FIG. 8

FLEXIBLE MULTIPLE SPREADSHEET DATA CONSOLIDATION SYSTEM

BACKGROUND OF INVENTION

The present invention relates generally to computer application programs and data consolidation techniques, and more particularly, to an application adaptable system and method of consolidating data contained within multiple spreadsheets.

In modern business, various metrics reports are routinely produced and distributed in the form of electronic spreadsheets, which are typically created using one of several commonly known spreadsheet and query software programs, such as those from Microsoft® Corporation and others including Quattro Pro™ and Lotus 123™. The spreadsheets may be located within one or more workbooks and may include for example supervisor, manager, and employee names and site locations, as well as identification, serial, code, revenue, and sales numbers.

Often the reports are produced at some regular time interval i.e. daily or weekly. When a user needs to analyze data within multiple reports across a time span greater than for example a week, data from individual reports must be consolidated into a single electronic format, such as a spreadsheet having desired data from each individual report.

Unfortunately, this consolidation is usually done manually, with the user opening each individual report, selecting desired data from each report, and copying the desired data into a new or common spreadsheet. Consolidation in this manner is inefficient, especially for large or complex data sets and complex or numerously repeated operations.

Several tabular consolidation and aggregation techniques currently exist. These techniques typically include aggregation of values from multiple tables to generate a single table. One such example is described in U.S. Pat. No. 5,272,628, by Koss. Although, these known techniques provide an efficient method of aggregating tabular values, they do not provide capability for manipulating spreadsheets or for combining various desired portions of spreadsheets in such a manner as to provide a consolidated report having a desired or custom arrangement of information.

Also, current tabular consolidation and aggregation techniques are not application flexible but rather are application specific. In order to apply a currently designed consolidation technique to a different application, software code of the technique needs to be manually reconfigured or rewritten to accommodate a newly introduced application. Current techniques do not allow an end user to select desired portions of specified spreadsheets for consolidation nor do they allow a user to select arrangement of a final report before generation thereof.

It would therefore be desirable to develop a system and method of efficiently consolidating multiple spreadsheets that provides flexibility in selection of the spreadsheets and portions thereof and allows for arrangement and configuration selection of a final or end.

BRIEF DESCRIPTION OF DRAWINGS

FIG. 2 is a sample workbook having multiple worksheets in accordance with an embodiment of the present invention.

FIG. 7 is a logic flow diagram illustrating a method of consolidating data from multiple spreadsheets in accordance with an embodiment of the present invention; and.

FIG. 8 is a sample final report spreadsheet in accordance with an embodiment of the present invention.

DETAILED DESCRIPTION

Figure 1:
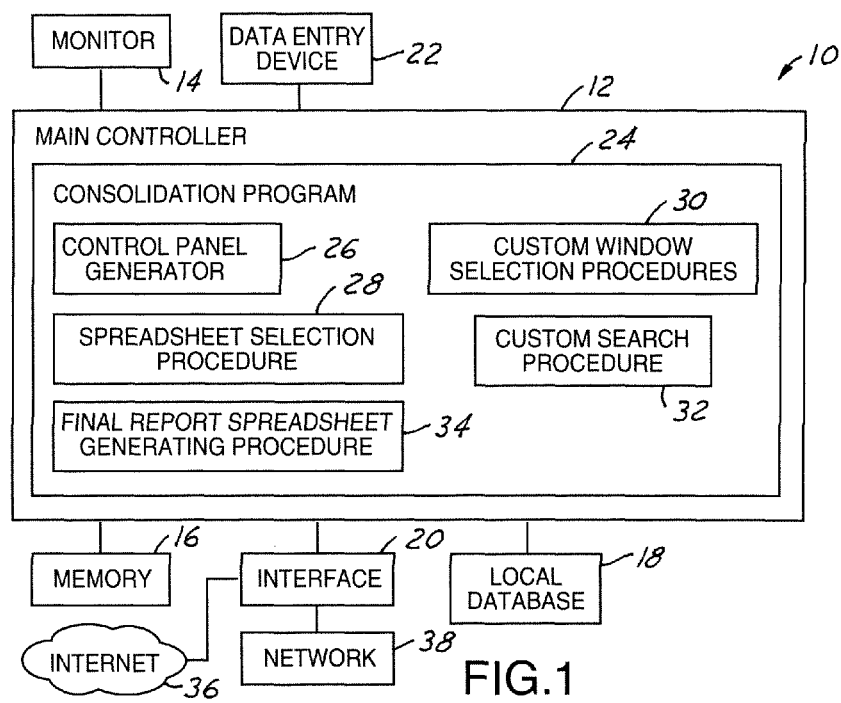
FIG. 1 is a block diagrammatic view of a multiple spreadsheet data consolidation system in accordance with an embodiment of the present invention.

In each of the following figures, the same reference numerals are used to refer to the same components. While the present invention is described with respect to a system and method of consolidating data from within multiple spreadsheets, the present invention may be adapted to be used in various other data consolidation systems and methods known in the art. Also, the present invention may be applied at customer sites, within remote terminals, at central offices, at call centers, or at various other sites, terminals, or centers known in the art.

In the following description, various operating parameters and components are described for one constructed embodiment. These specific parameters and components are included as examples and are not meant to be limiting.

Also, in the following description the term "search" refers to searching through selected spreadsheets for desired portions of data to be consolidated. For example, a search may consist of locating rows of data within desired spreadsheets that have a particular manager name for consolidation thereof. Other searches are described in further detail below.

The present invention provides a system and method of consolidating data from multiple spreadsheets. The method includes selecting multiple spreadsheets. Portions of data from files corresponding to each of the spreadsheets are also selected. Automated consolidation of said portions of data is executed. The consolidation includes retrieval of the portions of data, generation of a final report spreadsheet, and appendage of the portions of data to the final report spreadsheet.

One of several advantages of the present invention is that it provides an efficient automated spreadsheet consolidation method for consolidating desired information from multiple spreadsheets, thereby, saving time and costs involved in performing a consolidation process.

Another advantage of the present invention is that it provides flexibility by allowing a user to select desired spreadsheets and information within each spreadsheet for consolidation thereof.

Furthermore, the present invention is versatile in that it may be applied to various applications including spreadsheet and query based software programs, such as those from Microsoft® Corporation and others including Quattro Pro™ and Lotus 123™. Sample spreadsheet and query based programs from Microsoft® Corporation include Microsoft® Excel and Microsoft® Access.

Referring now to FIG. 1, a block diagrammatic view of a multiple spreadsheet data consolidation system 10 in accordance with an embodiment of the present invention is shown. The system 10 includes a main controller 12 that is preferably microprocessor based. The controller 12 controls operation of the system 10 and operation of a monitor 14, a memory device 16, a local database 18, and an interface 20. Although, the memory device 16 and the local database 18 are illustrated as separate components, these components may be combined into a single memory and may be in the form of RAM and/or ROM. The memory device 16 may be utilized for performing immediate tasks whereas the local database 18 may be used for storing information over a longer period of time. A data entry device 22 is coupled to the controller 12.

The system 10 may be in the form of a computer, as shown, or may be in the form of a main frame, a workstation, or other operating system known in the art.

The controller 12 includes a software-based consolidation program 24 for consolidating data from multiple spreadsheets. The program 24 includes a control panel generator 26 and a spreadsheet selection procedure 28 for selecting one or more spreadsheets. The program 24 may have multiple custom window selection procedures 30, each of which corresponding to generation of windows for selection of workbooks, worksheets, tables, cells, rows, columns, text or other custom selections known in the art. The program may also allow for data to be pulled from various databases known in the art. A custom search procedure 32 is used for selecting portions of each of the selected spreadsheets as determined by a user or by the controller 12. A final report spreadsheet generating procedure 34 generates one or more final reports and appends selected spreadsheet portions to the final reports. Various other procedures may also be included and will become apparent in light of the following description. The above-stated procedures and concepts are explained in further detail below. The program may be in the form of a Visual Basic™ program or in some other form known in the art.

The controller 12 may be coupled to an Internet 36 or a network 38 via the interface 20. The controller 12 may access various memories or databases locally, such as memory 16 and database 18, or may access memories and databases remotely that are located at other various locations, via the interface 20.

The local database 18 may include various file entries and be formatted into directories including multiple workbooks and worksheets.

Referring now also to FIG. 2, a sample workbook 50 having multiple worksheets 52 is shown in accordance with an embodiment of the present invention. A workbook, in general, refers to a grouping of multiple worksheets. A worksheet refers to a spreadsheet within and associated with a workbook. A worksheet may have any number of cells and may be arranged in rows and columns, as known in the art, such as cells 54, rows 56, and columns 58. A worksheet may be reviewed, selected, retrieved, modified or have some other act performed thereon or be included therein.

The cells 54 may have data entries that may include entries such as supervisor, manager, and employee names and site locations, as well as identification, serial, code, revenue, and sales numbers. The entries may also include other information known in the art that may be contained within a spreadsheet or correspond to a file containing spreadsheet information.

The data entry device 22 may be one of a various number of data entry devices such as a keyboard, a mouse, a touch screen, or other device used in computer applications. The data entry device 22 may be used to perform various selections as will become more apparent in review of the following description.

Figure 3:
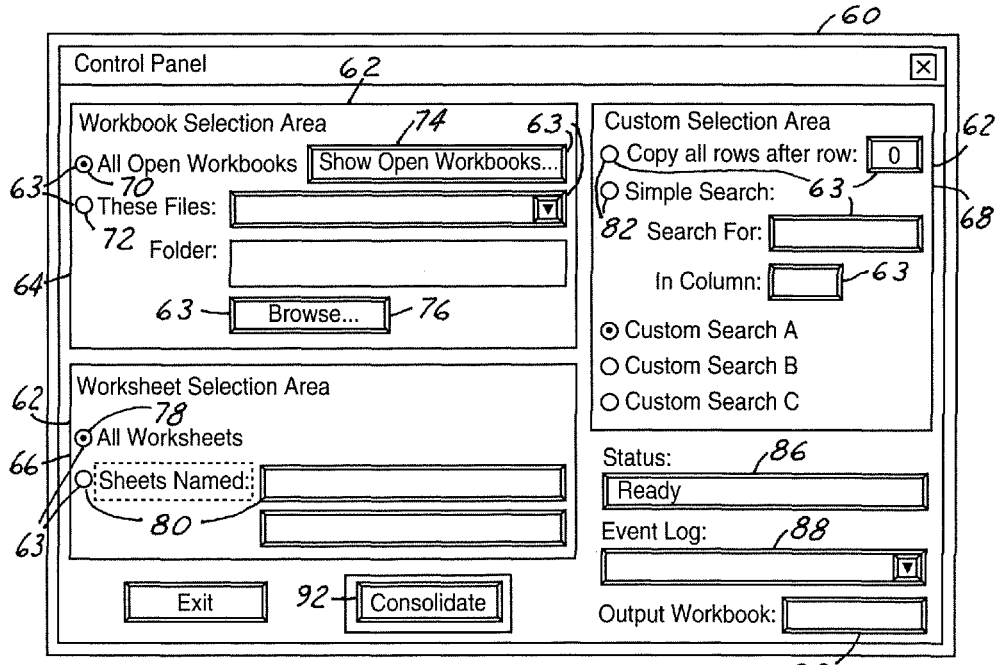
FIG. 3 is a control panel in accordance with an embodiment of the present invention.

Referring now to FIG. 3, a control panel 60 in accordance with an embodiment of the present invention is shown. The control panel 60 is shown for example and illustration purposes only, various similar control panels or windows may be used as known in the art. The control panel 60 may have various arrangements and contain various selection areas, such as spreadsheet selection areas 62. The selection areas 62 may include selection devices 63 for selecting rows, columns, cells, filenames, workbook names, worksheet names, spreadsheet names, as well as other selection parameters known in the art. The selection devices may be in the form of option or command buttons, combo buttons, text boxes, or in some other form known in the art.

The control panel 60, as shown, includes a workbook Selection area 64, a worksheet selection area 66, and a custom selection area 68. The workbook area 64 allows for a user to select all open workbooks, via an all open workbook selection 70, and to select workbooks that are stored in the memory 16 or database 18 that are not open, via a file selection 72. The workbook area 64 includes a show open workbook button 74 and a browse button 76 for showing and listing names of open workbooks and searching directories and for selecting desired workbooks, respectively.

The worksheet area 66 allows for a user to select all worksheets within the selected workbooks, via a worksheet selection 78, or select a subset of specific worksheets within each workbook, via worksheet subset selectors 80. Although, the worksheet area 66, as shown, only allows a user to select certain worksheet identifiers and based on these identifiers search each selected workbook for worksheets having the selected identifiers, the worksheet area 66 may be expanded to select and search for a particular worksheet identifier in selected workbooks only.

The custom selection area 68 allows a user to select desired cells, rows, and columns to search within the selected workbooks and worksheets, via selections 82. The custom search area 68 also includes selections 84 for custom predetermined and preprogrammed searches, which may be simply selected without entering desired cells, rows, or columns to be searched.

The control panel 60 may include a status indicator 86 and an event logger 88. The status indicator 86 may state whether the controller 12 is in an idle state and waiting to perform a consolidation task, whether a consolidation task is being performed and indicate name of the task being performed, time left in performing a current task, conclusion of a task, or other status indications known in the art. The event logger 88 displays step-by-step events that are being performed in a ladder or tree like format, so that a user may track steps that are performed and observe whether a proper consolidation is being performed. When an improper consolidation is being performed the user may choose to abort the current consolidation and perform another consolidation or simply exit the program 24. An output workbook textbox 90 is included for entering a name of a final report spreadsheet to be generated.

Once the desired selections have been made, the user may than process the desired consolidation, via a consolidate button 92. The control panel 60 may have other various windows type features, as known in the art. Although, the selection areas 62 are shown as being combined into a single control panel, they may each be separate windows that are separately opened, as is best seen in FIGS. 4, 5, and 6.

Although, selections 70, 72, 78, 80, 82, and 84 are shown as option buttons and although buttons 74, 76, and 92 are shown as command buttons the stated selections and buttons may be in some other form known in the art.

Figure 4:
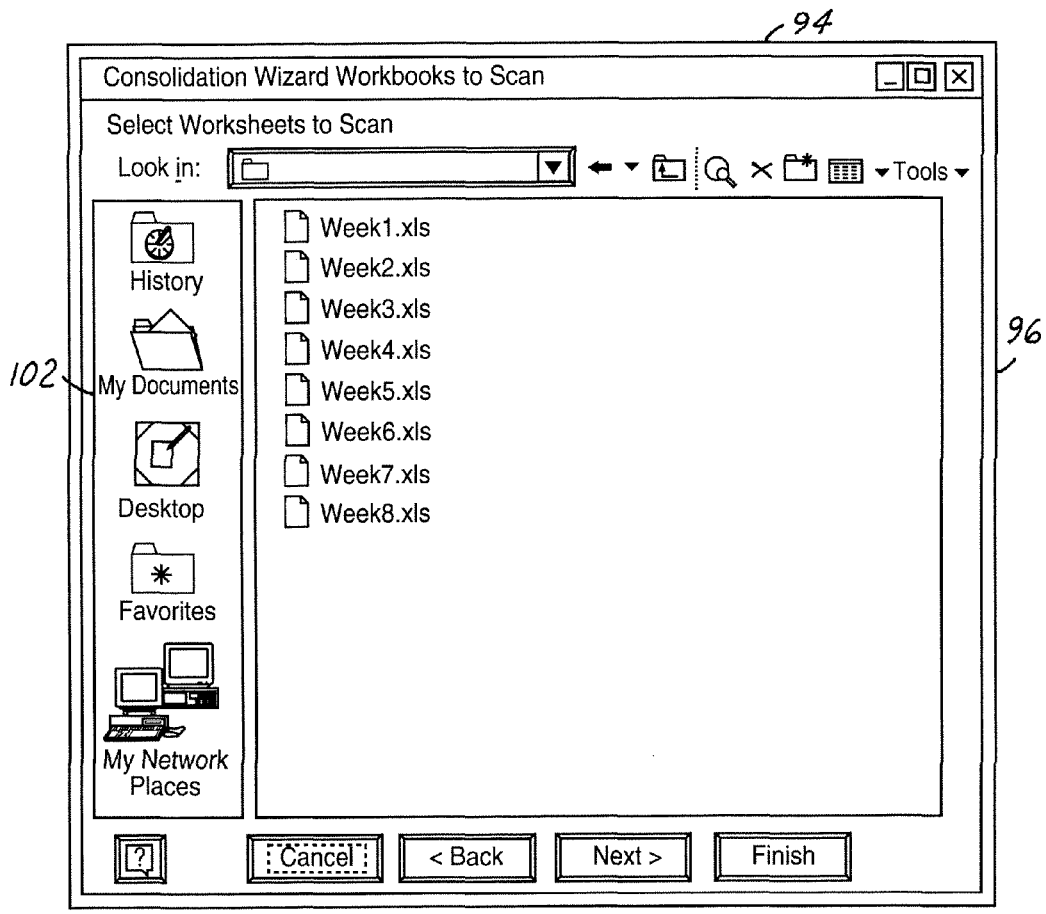
FIG. 4 is a workbook selection window in accordance with an embodiment of the present invention.
Figure 5:
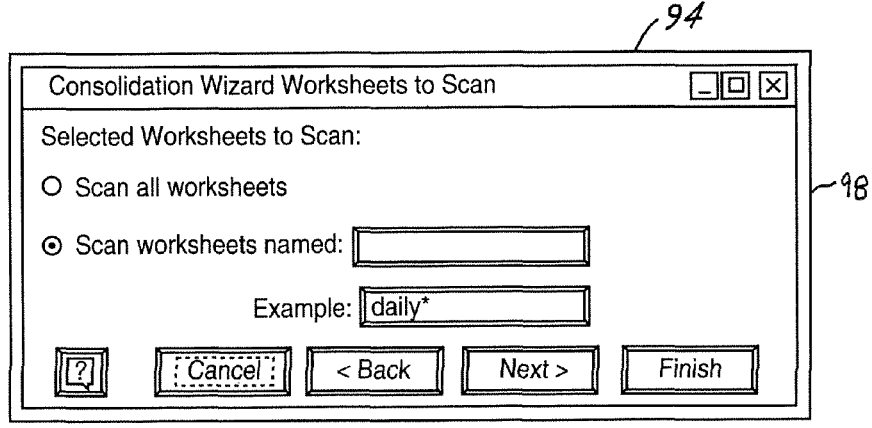
FIG. 5 is a worksheet selection window in accordance with an embodiment of the present invention.
Figure 6:
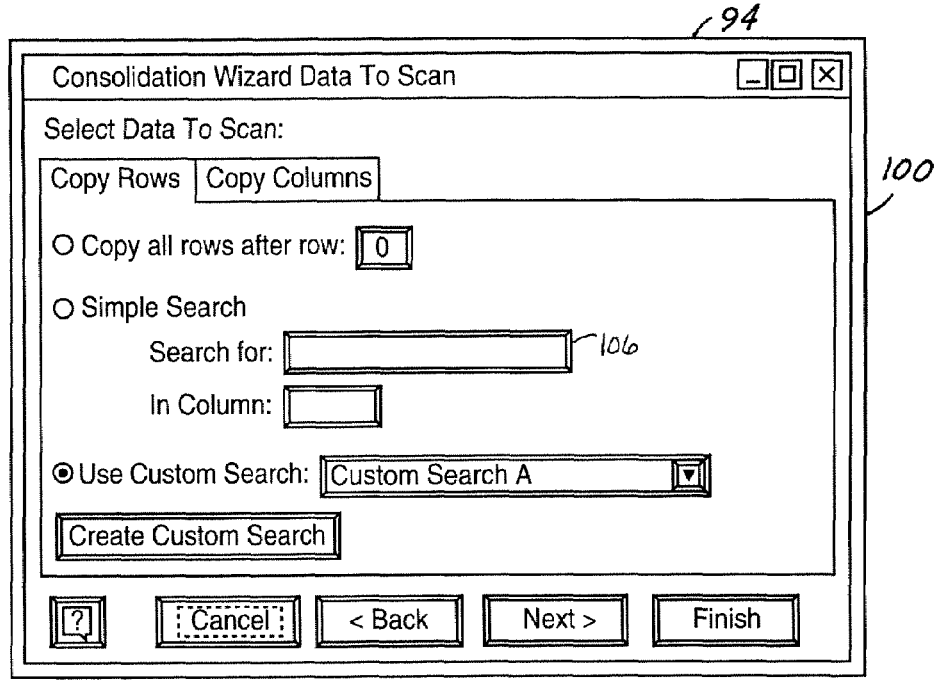
FIG. 6 is a custom selection window in accordance with an embodiment of the present invention.

Referring now to FIGS. 4, 5, and 6, multiple windows 94 including a sample workbook selection window 96, a sample worksheet selection window 98, and a sample custom selection window 100 in accordance with an embodiment of the present invention are shown. The windows 94 may be selected from within a control panel, like control panel 60, or may be selected elsewhere. The windows 94 may include a shortcut list, such as list 102, or a folder list (not shown) and allow for selection of specific files, as shown in FIG. 4. The custom selection window 100, as shown, has multiple folders 104 (only two are shown) for selecting specific cells, rows, and columns and further includes a folder for selecting or searching for specific text. A sample text entry box 106 is shown for selecting text in specified columns. For example, a user may enter desired text to search for and the system may than select cells, rows, or columns, having the desired text.

Additionally, the control panel 60 and the windows 94 may have buttons for custom search development, in which a user may store custom searches and reuse them at a later time or date, such as custom searches A-C shown in custom search area 68 of FIG. 3.

The control panel 60 as well as windows 94 may be in the form of a consolidation tool or wizard aid that may be selected within various word processing, data entry, spreadsheet, graphics, presentation, reporting, or other software programs known in the art, including those from Microsoft® Corporation and others including Quattro Pro™ and Lotus 123™.

Figure 7:
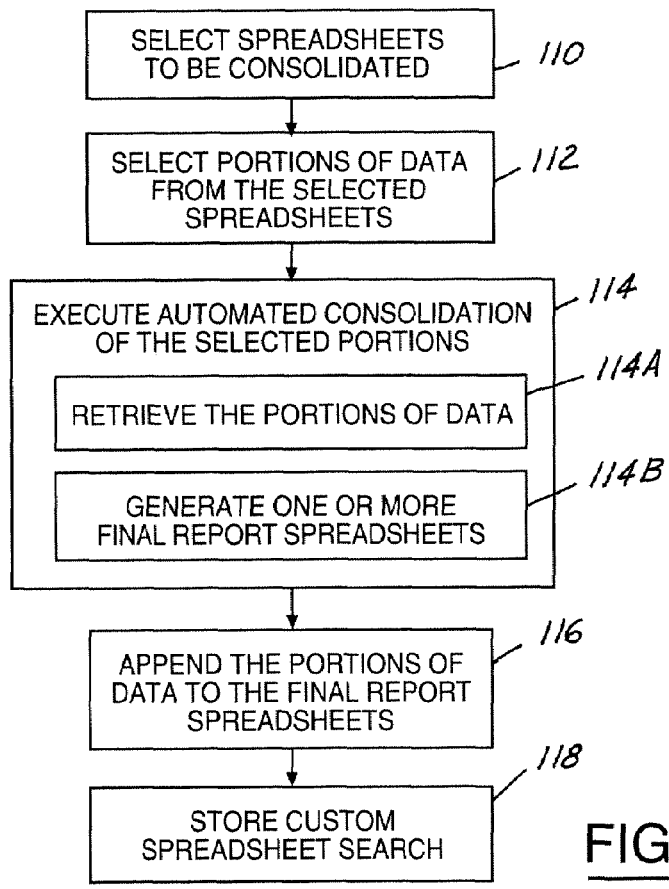

Referring now to FIG. 7, a logic flow diagram illustrating a method of consolidating data from multiple spreadsheets in accordance with an embodiment of the present invention is shown.

In step 110, one or more spreadsheets are selected as described above. The spreadsheets may be manually selected by a user through use of a control panel, such as control panel 60, or may be selected via the controller 12. One or more workbooks are selected from workbooks that are currently open and from workbooks that are stored in the memory 16, in the database 18, or in some other memory or database. Desired worksheets within the selected workbooks are also selected.

In step 112, portions of data from files corresponding to each of the selected spreadsheets are selected. A user may customly select the portions of data, via a control panel, or the custom selections may be previously stored in the memory 16 or database 18 and be selected by the controller 12. Rows, columns, cells, filenames, workbook names, worksheet names, and spreadsheet names of one or more files corresponding to the selected spreadsheets may be selected. Also, as stated above, desired text may be entered or selected for searching and consolidation of data contained within the selected spreadsheets.

In step 114, automated consolidation of the selected portions of data is executed. The consolidation may be executed via a process, a consolidate button, or the like, or may be executed by the controller 12 in response to some other task or result known in the art.

In step 114A, the controller 12 retrieves the portions of data from files containing each of the spreadsheets. The controller 12 may retrieve the information from memory 16, from the database 18, or from other storage devices known in the art.

In step 114B, the controller 12 generates one or more final report spreadsheets; one sample final report spreadsheet is shown in FIG. 8. The controller 12 opens a new workbook or worksheet and appropriately labels row and column headings.

In step 116, the controller 12 appends the portions of data from the selected spreadsheets to the final report spreadsheets. The order as to which the portions of data are appended may be determined simply by order of selection, which may be specified or selected in the control panel 60. The order may also be determined by the controller 12, by a user, or by some other technique known in the art. The controller 12 may append data to the final report spreadsheets that are not contained within the selected spreadsheets. For example, the controller 12 may append a workbook name or spreadsheet name to designate where the data was originally located. The portions of data may be appended to cells, rows, or columns of the final report spreadsheets.

In step 118, a custom search may be stored for use in future consolidations. When stored the custom search may be listed in custom selection area 68.

Upon finishing execution of the program 24 the final report spreadsheets may be saved and stored, so that they may be reviewed and possibly used in future consolidations with other or additional spreadsheets.

The above-described steps are meant to be an illustrative example; the steps may be performed sequentially, simultaneously, synchronously or in a different order depending upon the application.

Referring now to FIGS. 2 and 8, which are shown to further illustrate a sample spreadsheet consolidation in accordance with an embodiment of the present invention. The sample workbook 50 is shown in FIG. 2, having worksheets 52 that are to be consolidated into a single spreadsheet. The workbook 50 has a workbook or file name in the upper left hand corner 120 and each worksheet 52 is designated by a separate folder having a manager name that is located in a lower portion 122 of the workbook 50. Each worksheet 52 is similarly arranged.

The worksheets 52 are consolidated by the controller 12 to form a final report 124, as best seen in FIG. 8. Data contained within columns A-I of each worksheet 52 are shifted four columns over to be in columns E-M of the final report 124. The workbook name, center names, supervisor names, and the manager names are appended to Column A-D, respectively. The data originally contained within columns A-I of each worksheet is appended to columns E-M of the final report, accordingly, so as to correspond with the appropriate workbook name, center names, supervisor names, and manager names.

The present invention provides an efficient automated spreadsheet consolidation system and method that allows for quick and easy selection of spreadsheets and consolidation thereof. The present invention allows for custom spreadsheet consolidation and for custom consolidation techniques to be stored and selected. The present invention therefore, is capable of saving time and costs involved in performing spreadsheet consolidation for various different applications. The acts described herein may be directed by computer software code embodied as computer-readable data on a computer-readable storage medium. Examples of the computer-readable storage media include, but are not limited to memory, including RAM or ROM.

The above-described apparatus, to one skilled in the art, is capable of being adapted for various purposes and is not limited to control systems or other communication systems. The above-described invention may also be varied without deviating from the spirit and scope of the invention as contemplated by the following claims.

The invention claimed is:

1. A method of consolidating data from multiple spreadsheets comprising:
   storing a custom search, wherein the custom search enables execution of a predetermined search, wherein the predetermined search includes a search of a user-selected subset of cells, rows and columns of one or more of the spreadsheets;
   receiving a selection of a plurality of spreadsheets via a graphical control panel, the graphical control panel comprising a spreadsheet selection area that includes a workbook selection area to select workbooks that are not open for inclusion in the selection of the plurality of spreadsheets;

receiving a selection of portions of data from files corresponding to each of the plurality of spreadsheets;

wherein the portions of data comprise results of the custom search within the plurality of spreadsheets; and executing automated consolidation of the portions of data, wherein the automated consolidation comprises:

retrieving the portions of data; generating a final report spreadsheet;

appending the portions of data to the final report spreadsheet; and appending information identifying sources of the portions of data to the final report spreadsheet.

2. The method of claim 1, wherein the portions of data include at least one workbook.

3. The method of claim 1, wherein the portions of data include at least one worksheet.

4. The method of claim 1, wherein receiving a selection of portions of data further comprises receiving, via the graphical control panel, a selection of at least one of filenames, workbook names, worksheet names, and spreadsheet names of at least one file included in the plurality of spreadsheets.

5. The method of claim 1, further comprising automatically appending additional data to the final report spreadsheet, wherein the additional data is not within the plurality of spreadsheets.

6. The method of claim 5, wherein the additional data includes workbook names that designate original locations of the portions of data.

7. The method of claim 5, wherein the additional data includes spreadsheet names to designate where the portions of data were originally located.

8. A computer storage readable medium encoded with computer executable instructions to:

receive a selection of a plurality of spreadsheets via a graphical control panel, the graphical control panel comprising a spreadsheet selection area that includes a select all open workbooks selection to enable a search of all open workbooks, the selection of the plurality of spreadsheets comprising all open workbooks when the select all open workbooks selection is selected, the spreadsheet selection area including a workbook selection area to select workbooks that are not open for inclusion in the selection of the plurality of spreadsheets;

receive a selection of first portions of data from the plurality of spreadsheets via the graphical control panel;

identify second portions of data from the plurality of selected spreadsheets via a preprogrammed search wherein the preprogrammed search specifies a user-selected subset of cells, rows, and columns of one or more spreadsheets; and generate a final report comprising:
the first and second portions of data; and
workbook names to designate where the first and second portions of data were originally located.

9. The computer storage readable medium of claim 8, further comprising computer executable instructions to allow a user to define the preprogrammed search.

10. A multiple spreadsheet data consolidation system comprising:

a computer readable storage medium encoded with computer executable instructions, the computer readable storage medium including a controller, the controller including a custom search module adapted to execute a preprogrammed search to identify desired portions of data;

wherein the controller is adapted to:

display a graphical control panel on a monitor, the graphical control panel comprising a spreadsheet selection area to receive a selection of a plurality of spreadsheets that include the desired portions of data, the spreadsheet selection area comprising a select all open spreadsheets selection to select execution of the preprogrammed search on all open spreadsheets wherein the preprogrammed search specifies a user-selected subset of cells, rows, and columns of one or more spreadsheets, and the spreadsheet selection area comprising a workbook selection area to select workbooks that are not open for inclusion in the selection of the plurality of spreadsheets;

generate a final report spreadsheet;

append the desired portions of data to the final report spreadsheet; and append spreadsheet names identifying sources of the desired portions of data to the final report spreadsheet.

11. The system of claim 10, wherein the spreadsheet selection area comprises a worksheet selection area.

12. The system of claim 11, wherein the spreadsheet selection area comprises a worksheet subset selector.

13. The system of claim 10, wherein the graphical control panel further comprises a status indicator.

14. The system of claim 10, wherein the graphical control panel further comprises an event logger adapted to track generation of the final report spreadsheet and to report the tracking during generation of the final report spreadsheet, wherein the event logger presents consolidation events as the consolidation events are being performed.

15. The system of claim 10, wherein the spreadsheet selection area comprises a window to receive the selection of the plurality of spreadsheets.

16. The system of claim 10, wherein the graphical control panel is a consolidation tool.

* * * * *